US011901636B2

United States Patent
Orozco Valdes et al.

(10) Patent No.: US 11,901,636 B2
(45) Date of Patent: Feb. 13, 2024

(54) COMPACT ANTENNA TEST RANGE (CATR) ALIGNMENT VERIFICATION

(71) Applicant: NATIONAL INSTRUMENTS CORPORATION, Austin, TX (US)

(72) Inventors: Gerardo Orozco Valdes, Austin, TX (US); Dong Chen, Shanghai (CN)

(73) Assignee: National Instruments Corporation, Austin, TX (US)

( * ) Notice: Subject to any disclaimer, the term of this patent is extended or adjusted under 35 U.S.C. 154(b) by 674 days.

(21) Appl. No.: 17/089,464

(22) Filed: Nov. 4, 2020

(65) Prior Publication Data

US 2022/0140497 A1 May 5, 2022

(51) Int. Cl.
| | |
|---|---|
| *H01Q 21/24* | (2006.01) |
| *H01Q 13/24* | (2006.01) |
| *H04B 3/56* | (2006.01) |
| *H01Q 13/28* | (2006.01) |
| *H01Q 1/24* | (2006.01) |

(52) U.S. Cl.
CPC ............. *H01Q 21/24* (2013.01); *H01Q 1/246* (2013.01); *H01Q 13/24* (2013.01); *H01Q 13/28* (2013.01); *H04B 3/56* (2013.01)

(58) Field of Classification Search
CPC ........ H01Q 21/24; H01Q 1/246; H01Q 13/24; H01Q 113/28; H04B 3/56
USPC ......................................................... 342/364
See application file for complete search history.

(56) References Cited

U.S. PATENT DOCUMENTS

| | | |
|---|---|---|
| 8,605,774 B2 | 12/2013 | Rupp et al. |
| 9,917,755 B1 | 3/2018 | Rullmann et al. |
| 10,725,080 B2 | 7/2020 | Orozco Valdes et al. |
| 10,942,214 B2 | 3/2021 | Orozco Valdes et al. |
| 2017/0222735 A1* | 8/2017 | Kawamura .......... H04B 17/373 |
| 2018/0159640 A1 | 6/2018 | Taher et al. |

FOREIGN PATENT DOCUMENTS

| | | | | |
|---|---|---|---|---|
| CN | 104931799 B | * | 2/2018 | |
| CN | 110850187 A | * | 2/2020 | |
| EP | 3865886 A1 | * | 8/2021 | ......... G01R 29/0821 |

* cited by examiner

*Primary Examiner* — Harry K Liu
(74) *Attorney, Agent, or Firm* — Kowert, Hood, Munyon, Rankin & Goetzel P.C.; Jeffrey C. Hood

(57) ABSTRACT

Methods, apparatuses, and systems for verifying alignment of a compact antenna test range (CATR) are presented. A radio frequency (RF) profile may be generated based on test signals received by a reference antenna at a plurality of orientations. Phase and amplitude data of the RF profile may be used to determine whether the CATR is aligned properly.

20 Claims, 15 Drawing Sheets

COMPACT ANTENNA TEST RANGE (CATR) ALIGNMENT VERIFICATION

FIELD OF THE INVENTION

The present invention relates to the field of semiconductor testing, and more specifically, to calibration and alignment verification of compact antenna test range (CATR) equipment.

DESCRIPTION OF THE RELATED ART

Millimeter wave (mmW) technology is rapidly growing in importance, e.g., as $5^{th}$ generation (5G) wireless technology is becoming more widespread. Current methods for testing integrated circuits with integrated antennas for transmitting and/or receiving mmW signals may be slow and/or expensive.

Improvements in the field are desired.

SUMMARY OF THE INVENTION

Various embodiments are presented below of a system, apparatus, and method for verifying (e.g., rapidly and cheaply) the alignment of a system for testing antennas and devices with phased array antennas, e.g., such as integrated circuits (IC) with integrated antennas configured for millimeter wave (mmW) transmission and/or reception. For example, a compact antenna test range (CATR) may include components such as reflectors and test antennas; the CATR may perform poorly if the alignment of the elements is poor.

According to some embodiments, a reference antenna may be used to transmit and/or receive test signals in the CATR. The reference antenna may be rotated through a plurality of angles (e.g., azimuthal to the reflector and thus to the signals) while the test signals are transmitted. Measurements may be taken of the test signals while the reference antenna is in respective angles of the plurality of angles. The measurements may be compared to a signature (e.g., a radio frequency (RF) signature) of the measurements that would be expected if the elements of the CATR were in proper alignment. Based on the comparison, it may be determined whether or not the alignment of the CATR is within a tolerance, e.g., is acceptable for performing antenna testing.

BRIEF DESCRIPTION OF THE DRAWINGS

A better understanding of the present invention can be obtained when the following detailed description of the preferred embodiment is considered in conjunction with the following drawings, in which.

Figure 1:
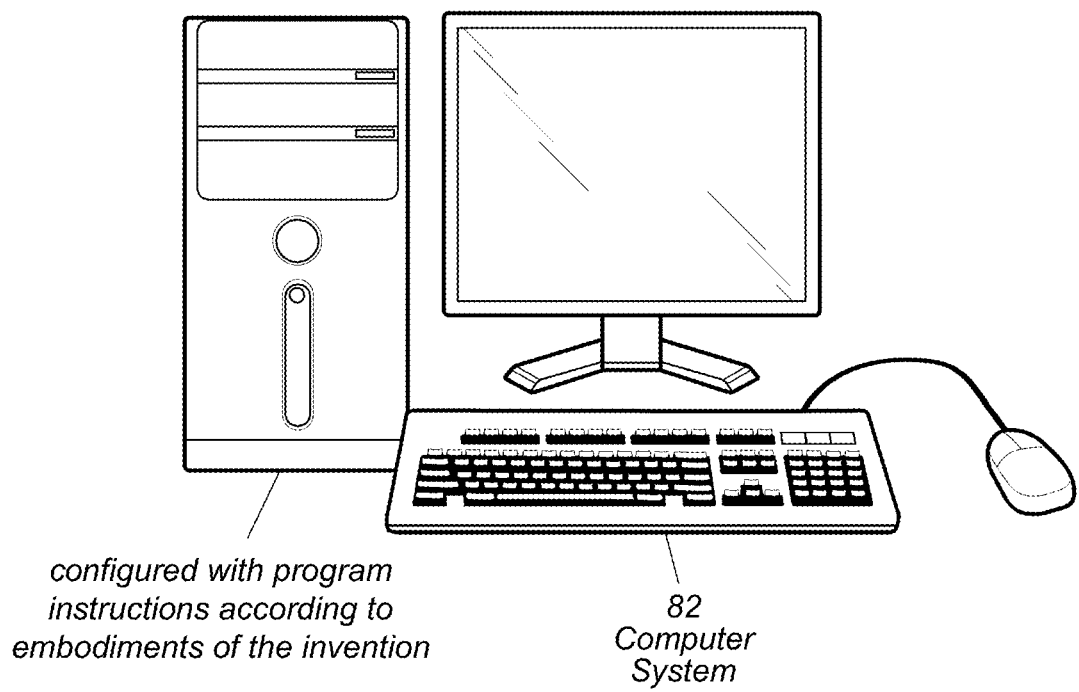
FIG. 1 illustrates a computer system configured to perform testing of an integrated circuit, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," wherein the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

FIG. 1—Computer System

FIG. 1 illustrates a computer system 82 configured to implement embodiments of the techniques disclosed herein. Embodiments of a method for (e.g., for production testing of integrated circuits) are described below. Note that various embodiments of the techniques disclosed herein may be implemented in a variety of different ways. For example, in some embodiments, some or all of the techniques may be implemented with textual or graphical programs that may be deployed to, or used to configure, any of various hardware devices.

However, while some embodiments are described in terms of one or more programs, e.g., graphical programs, executing on a computer, e.g., computer system 82, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As shown in FIG. 1, the computer system 82 may include a display device configured to display a graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs, such as graphical programs, that are executable to perform the methods described herein. The memory medium may also store operating system software, as well as other software for operation of the computer system. Various embodiments further include receiving or storing instructions and/or data implemented in accordance with the foregoing description upon a carrier medium.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2:
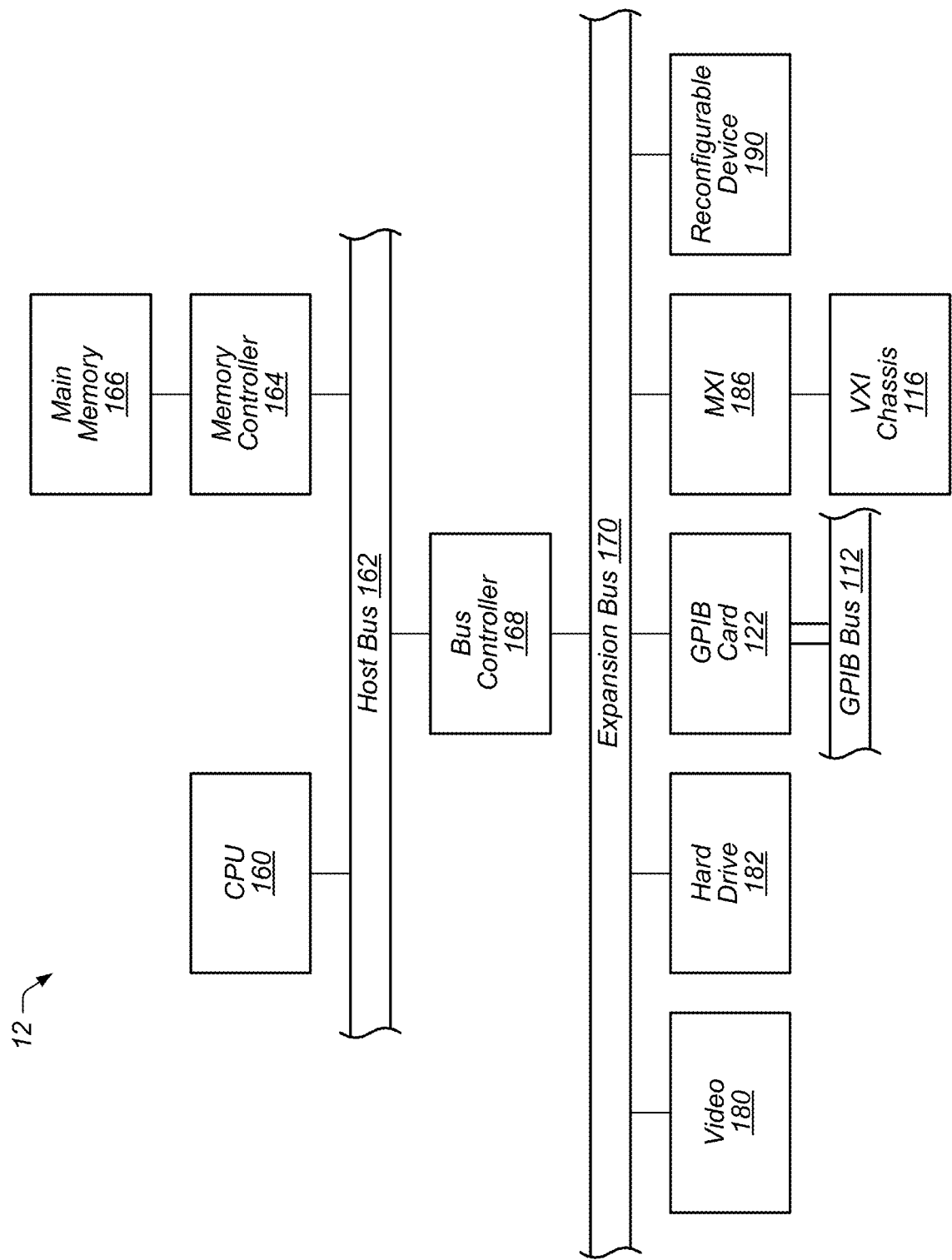
FIG. 2 is an exemplary block diagram of the computer system of FIG. 1, according to some embodiments.

FIG. 2—Computer System Block Diagram

FIG. 2 is a block diagram 12 representing one embodiment of the computer system 82 illustrated in FIG. 1. It is noted that any type of computer system configuration or architecture can be used as desired, and FIG. 2 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including any type of processor (or multiple processors), as well as other features. A memory medium, typically comprising RAM and referred to as main memory, 166 is coupled to the host bus 162 by means of memory controller 164. The main memory 166 may store a program (e.g., a graphical program) configured to implement embodiments of the present techniques. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a program to the device 190 for execution of the program on the device 190. The deployed program may take the form of graphical program instructions or data structures that directly represents the graphical program. Alternatively, the deployed program may take the form of text code (e.g., C code) generated from the program. As another example, the deployed program may take the form of compiled code generated from either the program or from text code that in turn was generated from the program.

FIGS. 3-8—Integrated Circuit (IC) with Antennas

Integrated circuits (IC) with integrated antennas are increasingly common. Such ICs are included in many devices and may be configured to perform various functions including wireless communication (e.g., including transmission and/or reception) and radar. In particular, 5G wireless communication standards (or other standards) may provide for the use of millimeter wave (mmW) band wireless signals and beamforming (e.g., directional transmission/reception). It is anticipated that upcoming cellular communication technologies such as 5G or other technologies may use multiple antennas in a coordinated fashion to focus the transmitted energy toward one spatial point. The pattern formed by the antenna elements is called a beam and the process of focusing energy is called beamforming. ICs or application specific ICs (ASICs) may be an important element of many wireless devices configured to communicate using such standards. For example, an IC with an integrated array of antennas (e.g., a phased array) may be a common means of including such 5G wireless capabilities.

Figure 3:
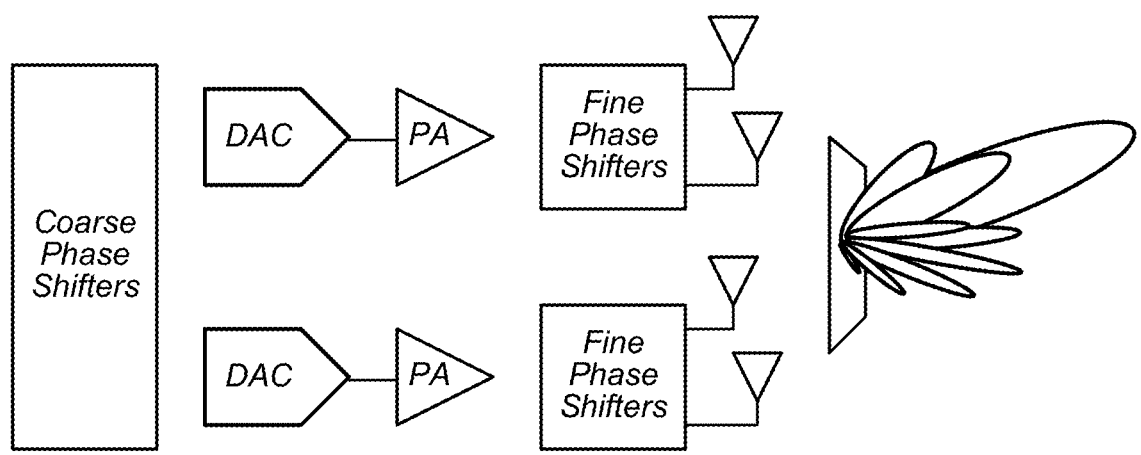
FIG. 3 illustrates multi-antenna beamforming using coarse and fine phase shifters, according to some embodiments.

FIG. 3 illustrates an example phase array architecture usable for beamforming. FIG. 3 illustrates a phase array antenna analog and digital hybrid architecture, useable to focus the energy of the Tx signal in a specific spatial location. As illustrated, course phase shifters process a digital signal which is sent through digital-to-analog converters (DACs) and power amplifiers (PAs) before being processed by fine phase shifters and transmitted by four antennas to form a directional beam.

Figure 4:
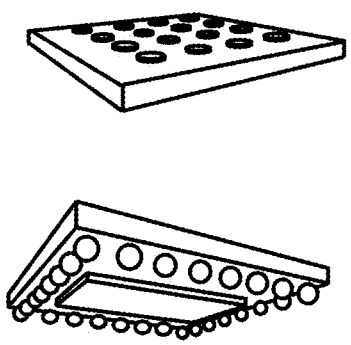
FIGS. 4-9 illustrate exemplary integrated circuit devices-under-test (DUTs), according to some embodiments.

FIG. 4 illustrates a phased array of antennas which may be incorporated into an IC such as a complementary metal-oxide-semiconductor (CMOS) Monolithic Microwave Integrated Circuit (MIMIC). The IC may be approximately 1 cm by 1 cm, among various possibilities.

Figure 5:
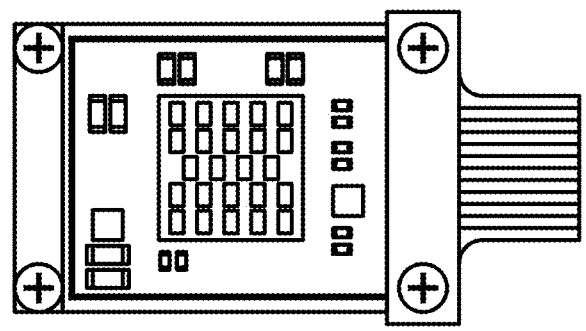

FIG. 5 illustrates an exemplary IC, including an integrated antenna array.

Figure 6:
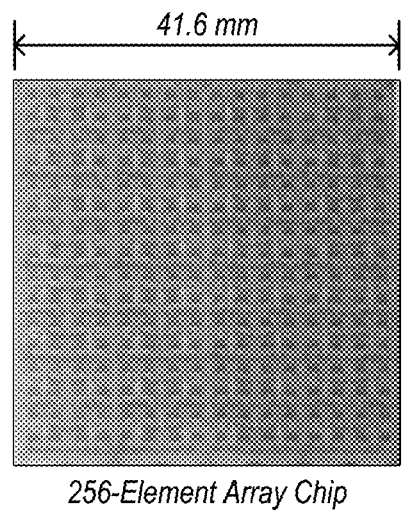

FIG. 6 illustrates an exemplary array of 256 antennas on a chip. It should be noted that other numbers or configurations of antennas are possible, as well as other sizes of chips, modules, and/or entire mobile devices or user equipment devices (UEs).

Figure 7:
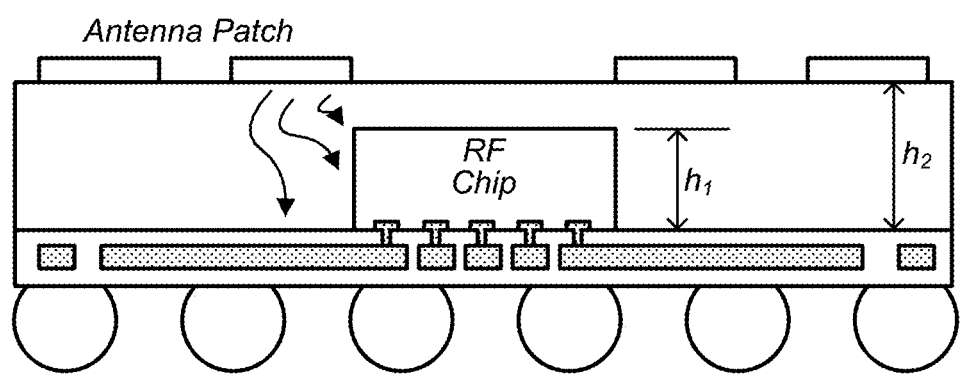

FIG. 7 illustrates an exemplary IC. As shown, the IC includes multiple (e.g., any desired number) antenna patches mounted to a chip (e.g., a printed circuit board (PCB), glass wafer, silicon wafer, etc.). The antenna patches may transmit signals to and from an integrated RF chip (or chips). Note that the RF chip may be included in the chip, but may not reach the full thickness of the chip. In the illustrated example, the RF chip reaches height h1, which is less than the full height of the chip, h2. The RF chip may be connected to other elements of the IC, e.g., via wired connections.

Figure 8:
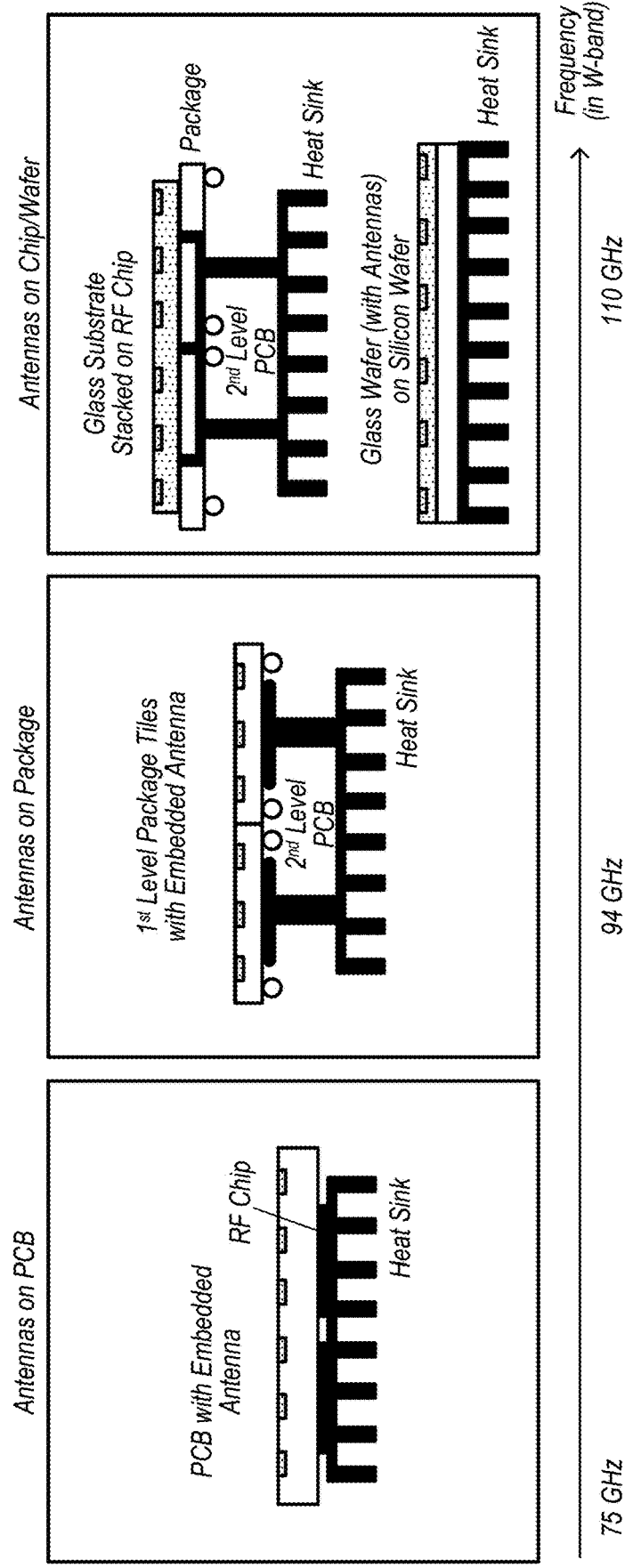

FIG. 8 illustrates different types of antenna connections of exemplary ICs. In a first configuration, antennas may be embedded in a printed circuit board (PCB), to which RF chips and a heat sink are mounted. Such a configuration may be useful for relatively low frequencies, e.g., approximately 75 GHz, according to some embodiments. In a second configuration, antenna patches may be embedded in package tiles, which are in turn mounted to RF chips and a (e.g., $2^{nd}$ level) PCB. The RF chips may be connected (thru the PCB) to a heat sink. Such a configuration may be useful for medium frequencies, e.g. 94 GHz, among various possibilities. A third configuration may include antenna patches embedded in a glass substrate and stacked on RF chips, e.g., above a package, $2^{nd}$ level PCB, and heat sink. In a variation, the glass wafer may be mounted on a silicon wafer instead of a package. Such configurations may be useful for higher frequencies, e.g., 110 GHz and above, among various possibilities.

Figure 9:
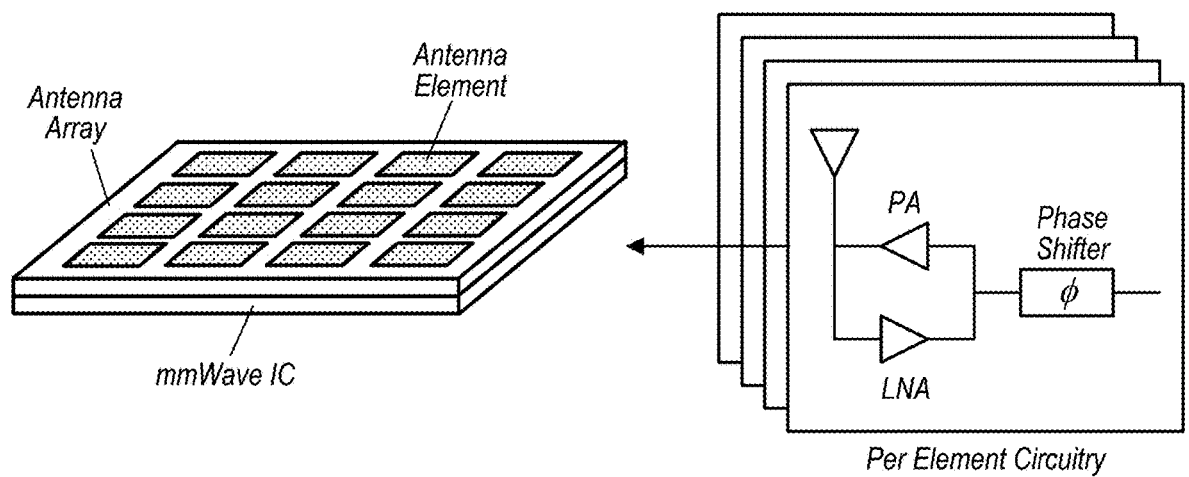

FIG. 9 illustrates an exemplary mmW IC with an integrated antenna array. As shown, each antenna element (e.g., patch) may have dedicated (e.g., per element) circuitry. Note that the specific antenna element circuitry shown is exemplary only, and that other antenna element circuitry configurations may be used, as desired.

Figure 10:
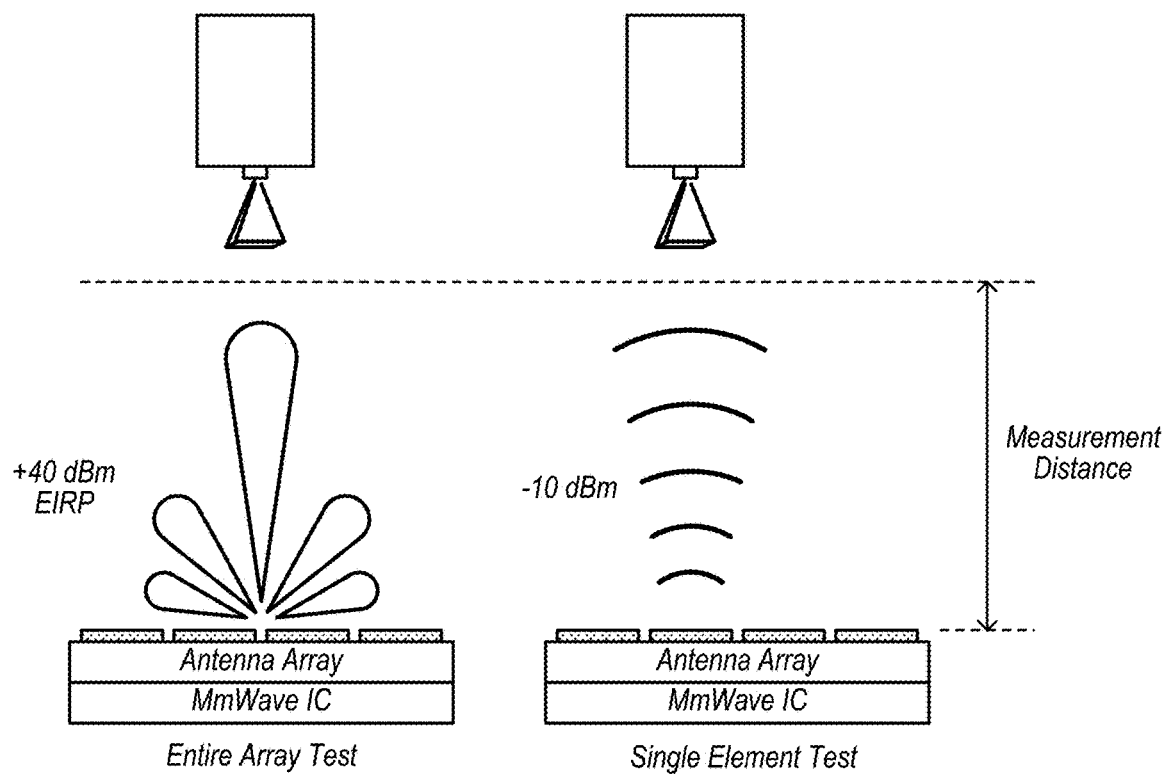
FIG. 10 illustrates measurement setup for an entire array test and a single element test, according to some embodiments.

FIG. 10—Testing of mmW IC RF Performance

As demand for ICs with integrated antenna arrays grows, improvements in the cost of producing and testing such ICs are desired. Testing of mmW ICs, e.g., according to conventional techniques, may be challenging for various reasons. The radio frequency (RF) performance (e.g., mmW transmission and reception) of an antenna under test (AUT) or device under test (DUT) may typically be tested over-the-air. As used herein, the term DUT may be understood to include an AUT, among various possibilities. Anechoic chambers are commonly used for these tests to avoid interference, e.g., due to reflected signals and multipath effects that can complicate test measurements. Beamforming requirements may lead to many antennas on a package or on a chip and it may be desired to test the beamforming directional capabilities of the antenna array/IC. Testing of the beamforming capabilities may be expensive, time-consuming, and/or difficult, as measurements may need to be taken from a potentially large number of positions, e.g., because the RF performance may vary spatially. In other words, in order to test the spatial RF performance, measurements must be taken in many positions (e.g., in 3 dimensions, e.g., as a function of x, y, and z position). Such detailed spatial testing may require complex calibration.

FIG. 10 illustrates certain aspects of over-the-air testing of RF performance, according to some embodiments. An entire array may be tested, e.g., using an antenna, e.g., a horn antenna as illustrated or other type of antenna (e.g., patch, dipole, loop, directional array, etc.). In order to test the beamforming capability of the array, the antenna (or antennas) may be positioned at a sufficiently large measurement distance that the beam is fully formed. Further, measurements may be taken from a variety of different positions in order to test the performance of the beam in different directions. An entire array test may involve relatively high power signals, e.g., +40 dBm, as shown, among various possibilities. Alternatively, single element tests may be performed. A single element test may require that the horn antenna be far enough away from the antenna element to be tested to avoid RF coupling. This distance may be smaller than the distance for beam formation, e.g., for an entire array test. A single element test may not test the beamforming performance of the array. Single element tests may involve relatively low power signals, e.g., -10 dBm, as shown, among various possibilities.

Figure 11:
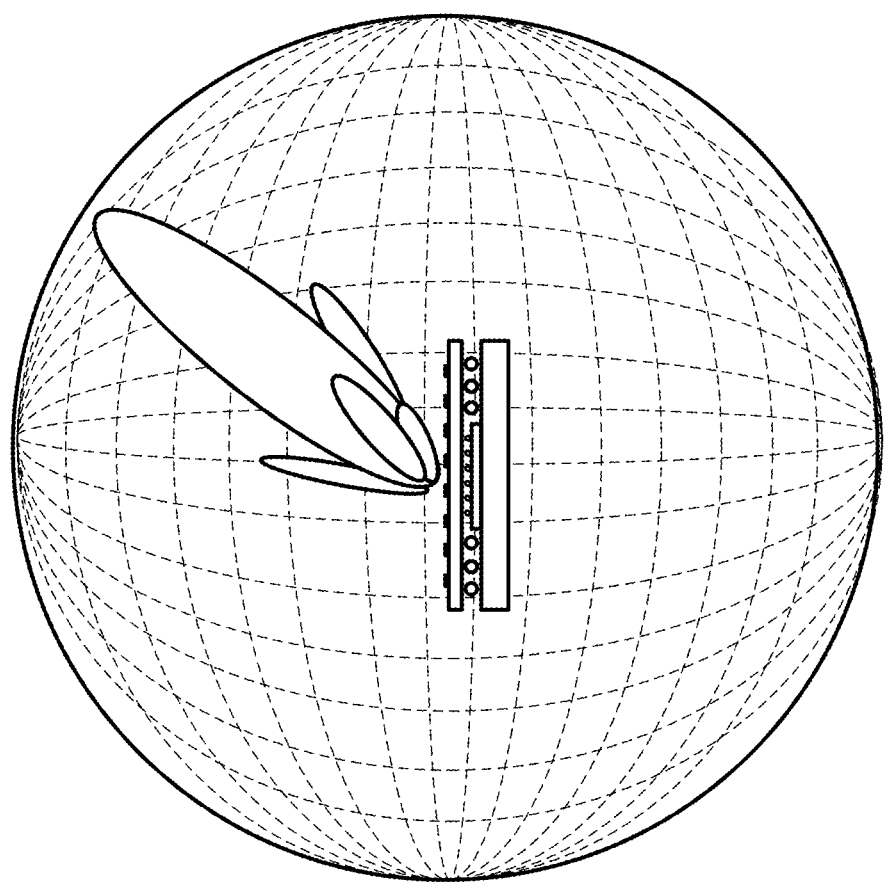
FIG. 11 is an illustration of a 3D beamforming pattern, according to some embodiments.

Because the electromagnetic pattern of a beamforming antenna array is characterized over the air (OTA), there are standardized ways to measure the actual signal strength of antennas in a controlled OTA environment. The antenna under test (AUT) or device under test (DUT) may be placed inside a chamber (possibly an anechoic chamber, to minimize reflections and interference from outside sources, though other types of chambers may be used, as desired). A signal may be transmitted by the antenna and one or more receive antennas (also located inside the chamber) may capture the received power. The DUT may then be moved across a discretized spatial profile. As these points are measured, a 3D pattern is created, as illustrated in FIG. 11. According to various embodiments, the measurement method may vary in the type of chamber used, the geometry and sequence of the measurement grid (e.g., equal angles, spiraling down a sphere, single cross plane points, etc.), and the calibration method used for the measurement process.

Additionally, while some embodiments describe a DUT that transmits a beamforming signal that is measured by one or more receivers within the chamber, an inverse setup is also possible where over-the-air (OTA) reception properties of the DUT are tested and/or characterized. For example, one or more transmitters may be positioned within the chamber, and the DUT may receive transmissions of the one or more transmitters, wherein reception characteristics of the DUT receiver may be characterized from a plurality of directions. As may be appreciated by one of skill in the art, methods and systems described herein may be adapted to embodiments where properties of one or more OTA receivers of the DUT are characterized. Accordingly, descriptive instances of an DUT and one or more receive antennas of the anechoic chamber may be respectively replaced with a receiver of a DUT and one or more transmit antennas of the anechoic chamber, according to some embodiments.

FIGS. 12-16—Anechoic Chamber Antenna Measurement Setup

Figure 12:
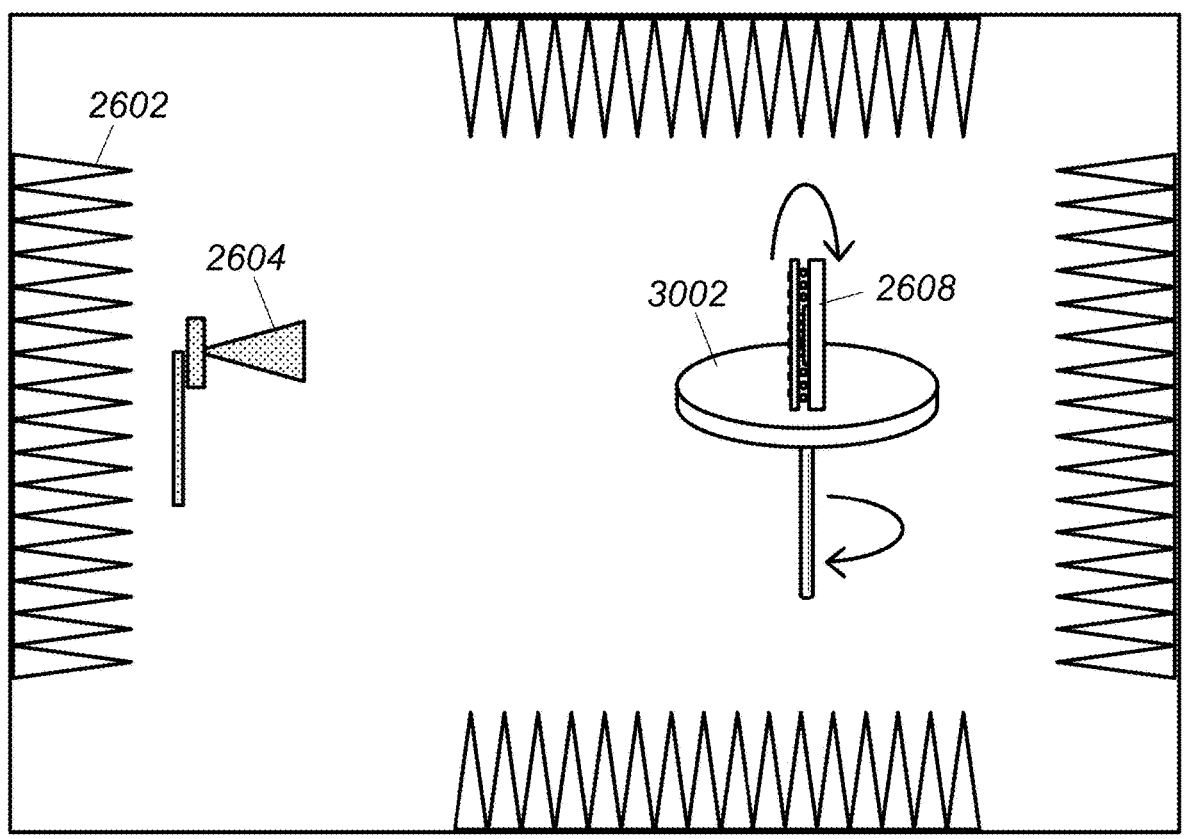
FIG. 12 is a schematic diagram illustrating a typical setup for over-the-air (OTA) antenna testing, according to some embodiments.
Figure 13:
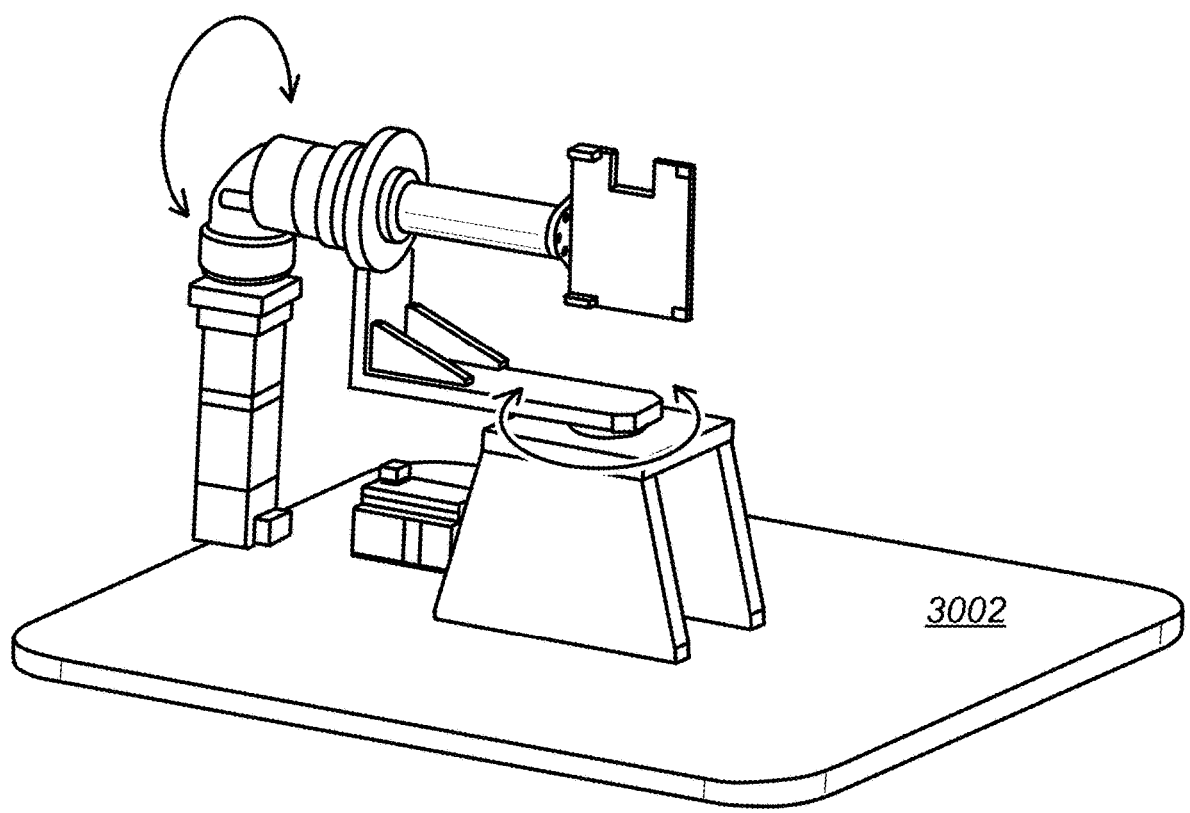
FIG. 13 is a detailed illustration of an exemplary adjustable positioner, according to some embodiments.

FIG. 12 is a schematic diagram illustrating a typical setup for OTA antenna testing, according to some embodiments. As illustrated, the adjustable positioner 3002 may rotate along two orthogonal axes (or only one axis, in some embodiments) to capture the output pattern of the DUT 2608 according to a plurality of spatial orientations and/or to test the reception of the DUT 2608 (e.g., of transmissions from test antenna 2604) according to a plurality of spatial orientations. Dampeners 2602 of the anechoic chamber may prevent reflections and interference of signals between the DUT 2608 and test antenna 2604. Test antenna 2604 may measure signals received from the DUT 2608 and/or transmit test signals to the DUT 2608. The movement of positioner 3002, and thus of DUT 2608, may be controlled via test sequencing software that ensures that the turntable is in the right angle, after which the RF measurement may take place. A more detailed illustration of an exemplary adjustable positioner 3002 is shown in FIG. 13, where the arrows indicate the two orthogonal axes of rotation of the positioner. As may be appreciated by those of skill in the art, any of a variety of types of adjustable positioners may be used to hold and orient the DUT according to a plurality of orientations, and the examples illustrated for the adjustable positioner in FIGS. 12 and 13 are exemplary only, and are not intended to limit the scope of the disclosure.

Figure 14:
FIG. 14 is a schematic diagram illustrating an OTA antenna testing setup using a combination of a positioning arm and rotary positioner, according to some embodiments.

FIG. 14 in an isometric illustration of an OTA testing setup wherein an adjustable positioning arm is combined with DUT rotation. For example, each of the reception antenna(s) and the DUT may be separately rotatable to a plurality of orientations.

Figure 15:
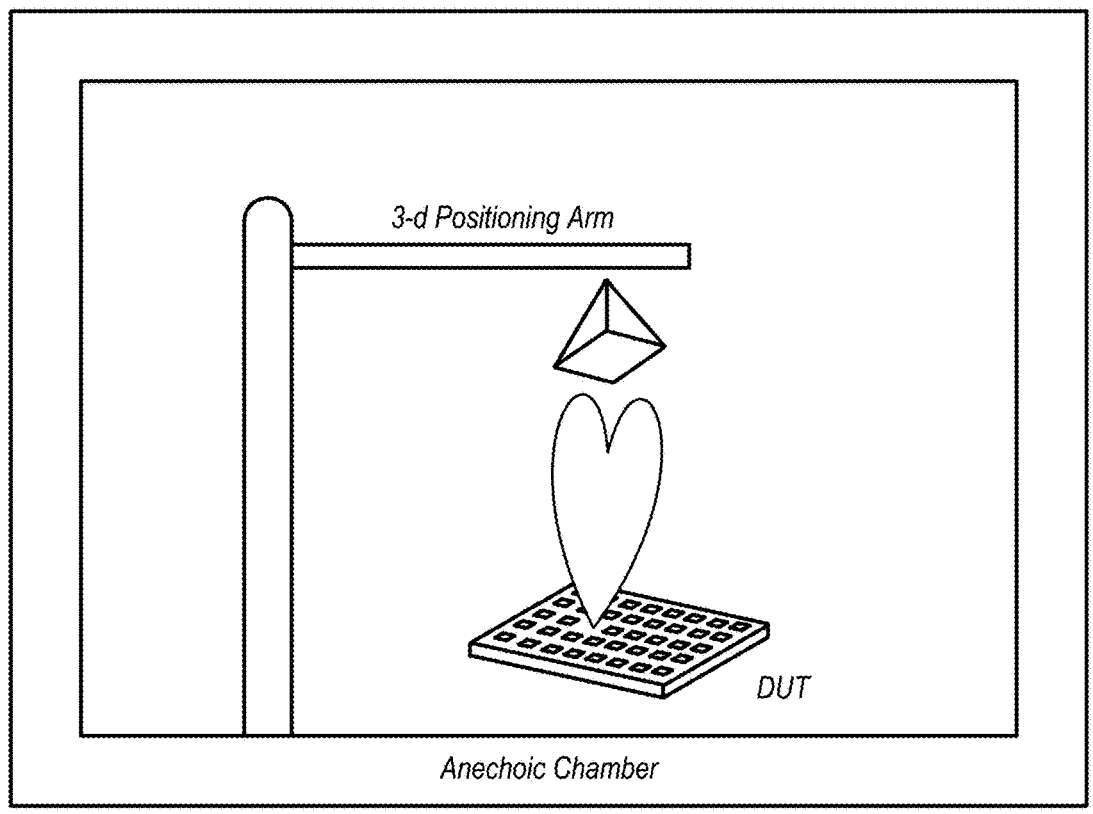
FIG. 15 is an isometric illustration of an OTA antenna testing setup using a 3D positioning arm, according to some embodiments.

In other embodiments, as illustrated in FIG. 15, a mmW array of antennas may be tested using a 3-D positioning arm, wherein the DUT is stationary but the receive antenna(s) rotate through a sequence of positions. FIG. 15 is a schematic illustration of an anechoic chamber configured with a 3-D positioning arm. Such 3-D positioning arm may operate in an anechoic chamber, e.g., sized for 18-87 GHz frequencies, among various possibilities. The 3-D positioning arm may perform spiral scanning, e.g., to take measurements at any number of locations, e.g., using a horn antenna. As illustrated in FIG. 15, the DUT may be mounted in the chamber, and may be configured to transmit a signal in a beamforming pattern (e.g., in a tested beam form). The 3-D positioning arm may move a horn antenna in various positions in the chamber for measurements.

A low reflection antenna (e.g., a small radar cross section) may be used for testing, e.g., in order to minimize effects on the fields. The measurements may be taken in the near field (e.g., in the Fresnel zone of the near field). Tests may be performed to measure magnitude and phase of the signal/field at any number of locations. The far field pattern may be computed based on the near field measurements. The conversion of near-field to far-field may be accomplished using any appropriate calculation approach. Such calculations may be relatively straight forward if the antenna pattern/configuration is known, or more complex for an arbitrary pattern. Plots of the far field pattern may be generated. Such a 3-D positioning system may be useful for design and characterization tests, however the equipment may be relatively expensive and the tests may be time consuming. First, the testing process itself may take significant time, e.g., because of the need to move the 3-D positioning arm through a large number of positions to test each DUT. Second, the anechoic chamber may need to be large enough to allow for measurements to be taken in enough positions (e.g., in 3-D space) to compute the far field pattern. In some embodiments, the anechoic chamber may be large enough so that measurements may be taken in the radiating far field. In some embodiments, a compact antenna test range (CATR) may employ a reflector to reduce the far field distance, enabling far field measurements within a smaller anechoic chamber.

Figure 16:
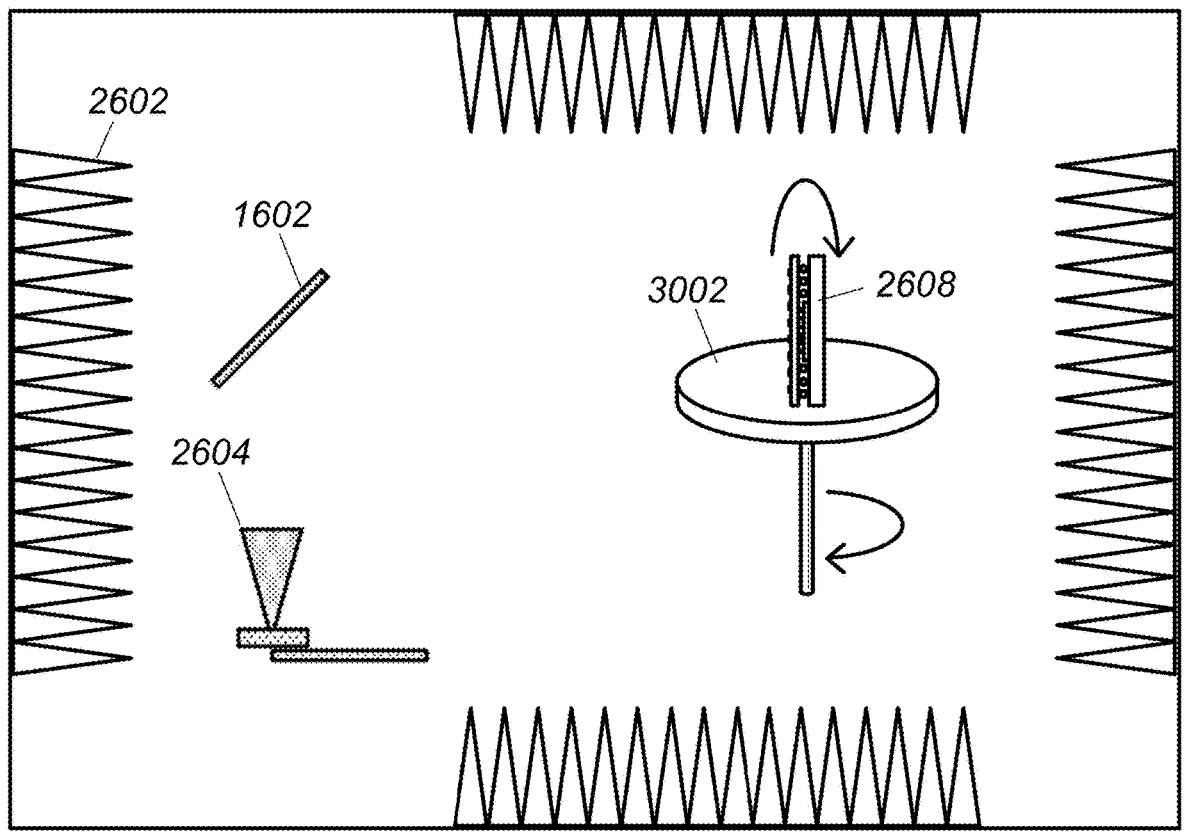
FIG. 16 is a schematic diagram illustrating a compact antenna test range (CATR), according to some embodiments.

FIG. 16 illustrates a CATR, according to some embodiments. The CATR of FIG. 16 may incorporate the elements of the system of FIG. 12, e.g., as described above, but in a different arrangement. The CATR further includes a reflector 1602. The test antenna may be at a different location and angle. For example, the test antenna 2604 may be pointed toward the reflector 1602. The reflector 1602 may collimate the radiated pattern, e.g., thus creating a planar wave in a shorter distance than would occur without the reflector. The reflector 1602 may direct the radiated pattern toward the AUT 2608 and/or the positioner 3002.

In some embodiments, the DUT 2608 may be replaced by a reference antenna, e.g., for alignment verification of the CATR.

FIGS. 17-20—Alignment Verification of a Compact Antenna Test Range (CATR) System A Compact Antenna Test Range (CATR) may be a type of anechoic chamber that reduces the size of the chamber for a test, e.g., by reducing a distance that is needed between the measurement antenna and the DUT. For example, the CATR may use reflection (e.g., using one or more reflectors) so that a signal travelling between a DUT and a feed antenna (e.g., a test antenna, such as 2604) may travel a greater distance (entirely within the chamber) than any dimension of the chamber. CATR may entail substantial coordination between the feed antenna and the RF reflector(s) 1602. For example, the feed antenna and reflector may be placed in specific locations relative to each other to produce a good RF planar wave.

Various means to evaluate the planarity of the wave in a CATR system may use a point-by-point approach including collecting phase and amplitude information individually in each point using a Vector Network Analyzer (VNA). Such methods to verify the quiet zone directly may involve measuring the quiet zone in all amplitude and phase aspects.

For example, a first method may use a scanner, which may physically move the DUT to a grid of points co-planar to the expected RF planar wave from the CATR system. Then the VNA may measure at each location creating a (x,y) grid of measured points. The point measurements may be plotted in "x-cuts" and "y-cuts" and post processed to examine the quality of the Quiet zone.

Another method to measure the Quiet Zone is described by a 3GPP standard method, e.g., "Validating quiet zone characterization using 3GPP specification TR 38.810 (Annex D, Annex E), and further discussed in 3GPP specification TR 38.903 (B.3.2).

These methods may be expensive and time consuming. For example, a scanner may require two axis precise motors and mechanically great control of the location. The 3GPP method may take several days to execute as a result of the level of manual work moving the antenna and collecting data. However, these methods may give precise numbers on the quality of the quiet zone. Even if it is desired to determine if the CATR system is still aligned within the tolerances, the full method may need to run before a pass or fail determination is reached.

Figure 17:
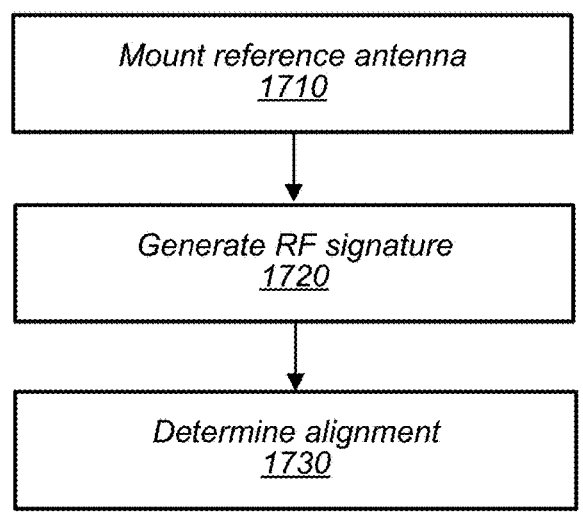
FIGS. 17 and 18 are flow chart diagrams illustrating example methods of verifying alignment of a CATR, according to some embodiments.

FIG. 17 is a flow chart diagram illustrating a potential test that may improve the speed and cost needed to "validate" the alignment of a CATR system, according to some embodiments. The method of FIG. 17 may use a radio frequency (RF) signature (e.g., phase and amplitude characteristics of test signals transmitted within the CATR) to relatively quickly determine if the CATR is out of alignment, e.g., or not aligned within a desired tolerance. It is noted that the method of FIG. 17 is merely one example of a possible method, and that features of this disclosure may be implemented in any of various methods, as desired. Aspects of the method of FIG. 17 may be implemented by a system including an OTA system, such as illustrated in and described with respect to the Figures, among other systems and devices, as desired. For example, the method of FIG. 17 may be performed by a computer system 82 or a processor in communication with a CATR, e.g., as illustrated in FIG. 16, among various possibilities. For example, a computer or processor may cause the CATR system to perform any or all of the methods automatically, e.g., during an alignment verification routine. In various embodiments, some of the elements of the methods shown may be performed concurrently, in a different order than shown, may be substituted for by other method elements, or may be omitted. Additional method elements may also be performed as desired. As shown, the method may operate as follows.

A reference antenna (or a reference DUT) may be mounted in an adjustable positioner 3002 of a CATR system (e.g., an anechoic chamber) (1710), according to some embodiments. The reference antenna may be an antenna (e.g., or phased array of antennas, among various possibilities) with known performance characteristics. Similarly, the reference antenna (or reference DUT) may be a device similar to a DUT with known performance characteristics. For example, the reference antenna (or reference DUT) may be configured to transmit and/or receive test signals in the CATR system and may have performance characteristics (e.g., related to transmitting/receiving the test signals) similar to the type of DUTs to be tested. In other words, the reference antenna may be previously verified to transmit/receive signals according to a standard level of performance. The performance characteristics may include transmit power, receive sensitivity, gain, phase, efficiency, and beamforming capabilities, among various possibilities.

The reference antenna (or reference DUT) may be mounted according to a specified polarization. For example, the reference antenna may be mounted in a vertical (V) polarization.

The CATR system may include an anechoic chamber (e.g., as illustrated in FIG. 16) with the adjustable positioner 3002, one or more test antennas 2604 (e.g., feed antennas), and one or more reflectors 1602 inside the anechoic chamber. In some embodiments, a dual axis positioner may be used. In other embodiments, a single axis positioner, a triple axis positioner or other type of positioner (e.g., rotational/angular or linear/planar, etc.) may be used to position the reference antenna, e.g., instead of a dual axis positioner. The adjustable positioner may be configured to change the position of the reference antenna, e.g., automatically. The reference antenna (or reference DUT) may be positioned in the positioner 3002 instead of a DUT 2608. In other words, for alignment verification of the CATR, the DUT may be replaced with a reference antenna (or a reference DUT).

In some embodiments, the reference antenna (or DUT) may be operably connected to a signal analyzer (SA) and the test antenna may be operably connected to a signal generator (SG). In some embodiments, either or both of the reference antenna and/or test antenna may be operably connected to a Vector Network Analyzer (VNA), e.g., instead of or in addition to the SA or SG.

A radio frequency (RF) signature of the current alignment of the CATR system may be generated (1720), according to some embodiments. For example, a plurality of test signals may be transmitted (e.g., by a test antenna in combination with a SG) and received (e.g., by a reference antenna) while the reference antenna is in a corresponding plurality of different orientations. The plurality of test signals may be transmitted according to one or more polarizations. The received signals may be measured, e.g., by an SA. Data about the received signals, such as amplitude and phase, may be recorded. The recorded data may be referred to as the RF signature.

Based on the RF signature, the alignment (e.g., or misalignment) of the CATR may be determined (1730), according to some embodiments. For example, one or more characteristic of the RF signature may be compared to characteristics of an RF signature that would be expected if the alignment of the CATR were good. For example, various peaks in the amplitude of the received signals may be determined and compared. If the difference in amplitude of the peaks exceeds a threshold, it may be determined that the CATR is not aligned (e.g., within a tolerance associated with the threshold). Note that different thresholds may correspond to different alignment tolerances, e.g., a lower threshold may correspond to a stricter alignment tolerance. Similarly, phase differences associated with different orientations of the reference antenna may be determined and compared to a threshold. Again, if the phase difference exceeds the threshold, it may be determined that the CATR is not aligned (e.g., within a tolerance associated with the threshold).

It will be appreciated that the characteristics of the RF signature discussed above are only examples, and other characteristics may be used as desired. For example, various measurements of the height, steepness, or breadth of the peaks may be used. Such measurements may be based on curve-fitting, regression, or other statistical techniques. Similarly, graphical and/or calculus techniques may be used (e.g., slope or derivative of curves for amplitude or phase as a function of angle, etc.). Still further, measures of standard deviation or variance of a measurements compared to expected values may be used (e.g., to quantify the amount of difference between the observed measurements and expected measurements).

It will be appreciated that the method of FIG. 17 is primarily described with respect to the reference antenna receiving signals transmitted by the feed antenna. However, this is only an example. The method of FIG. 17 may be applied in the case of the reference antenna transmitting and the feed antenna receiving test signals. Further, the method of FIG. 17 may be applied with either or both antennas moving to different positions and/or orientations. For example, the reference antenna may move, the feed antenna may move, or both the reference and feed antenna may move.

It will be appreciated that the method of FIG. 17 is primarily described with respect to testing alignment of a CATR, however the CATR is only an example. The method of FIG. 17 may be applied to other systems, e.g., other systems requiring precise alignment of one or more antennas, one or more reflectors, and/or one or more lenses.

In some embodiments, the method of FIG. 17 may be implemented as an algorithm. For example, a computer system or processor may run software causing a CATR system to automatically perform the measurements. The computer system or processor may determine whether or not the CATR system is in alignment based on the measurement results.

The RF signature process illustrated in FIG. 17 may offer a number of advantages, e.g., relative to prior art approaches. For example, the process may be completed quickly. For example, software implementing the method may cause the measurements to be performed and an alignment check test may be completed in less than 30 seconds providing an alignment check test result much faster than any previous art, according to some embodiments.

Further, the method of FIG. 17 may rely on simpler and less expensive test equipment relative to prior art methods. For example, a signal generator (SG) and signal analyzer (SA) may be used, e.g., instead of a VNA. This may reduce cost.

Further, the method of FIG. 17 may use hardware triggers to synchronize the positioner rotation and signal generation. This may contribute to the validation speed. Such hardware signals are described in U.S. patent application Ser. No. 16/141,697, which is incorporated by reference as though fully and completely set forth herein.

Further, the method of FIG. 17 may detect different planar wave defects, like tilt and/or off-center. This detection may be useful to correct alignment issues. For example, a reflector tilt error may be detected if the measured peaks are off in amplitude (e.g., if the measured amplitude peaks are different by more than the threshold). Similarly, an off-center error may be detected if the symmetry of the capture is not met. For example, a phase difference between two points (e.g., symmetric points) exceeding a threshold may indicate an off-center error (e.g., the reflector, feed antenna, and/or reference antenna may be out of position).

In some embodiments, the method of FIG. 17 may be performed with two (or more) signatures. When the peaks of the most outer signature are proportionally similar to the peaks on the inner signatures, then this may be considered an indication of a tilt error. In the case that the outermost signature is not proportional, then this may be considered an indication of an off-center error.

In some embodiments, the CATR system may (e.g., automatically) re-align one or more components (e.g., by adjusting the position and/or orientation). For example, a reflector's tilt may be adjusted to correct a reflector tilt error and/or a reflector's position may be adjusted to correct a reflector off-center error. Similarly, the position or tilt of a feed antenna and/or reference antenna may be adjusted. Further, the position or tilt of an attachment point (or attachment system) for a DUT may be adjusted. In some embodiments, an indication of any alignment errors may be provided, e.g., via computer system.

In some embodiments, the method of FIG. 17 may be performed with the reference antenna in a single position (e.g., but different orientations at that position). In other words, the positioner may not move the reference antenna to different positions within the anechoic chamber to perform measurements.

In some embodiments, if (e.g., or once) the CATR is aligned within a desired tolerance, the CATR system and/or associated computer system may provide an indication that the system is aligned. In some embodiments, the CATR system may automatically begin testing DUTs in response to a determination that the system is aligned.

Figure 18:
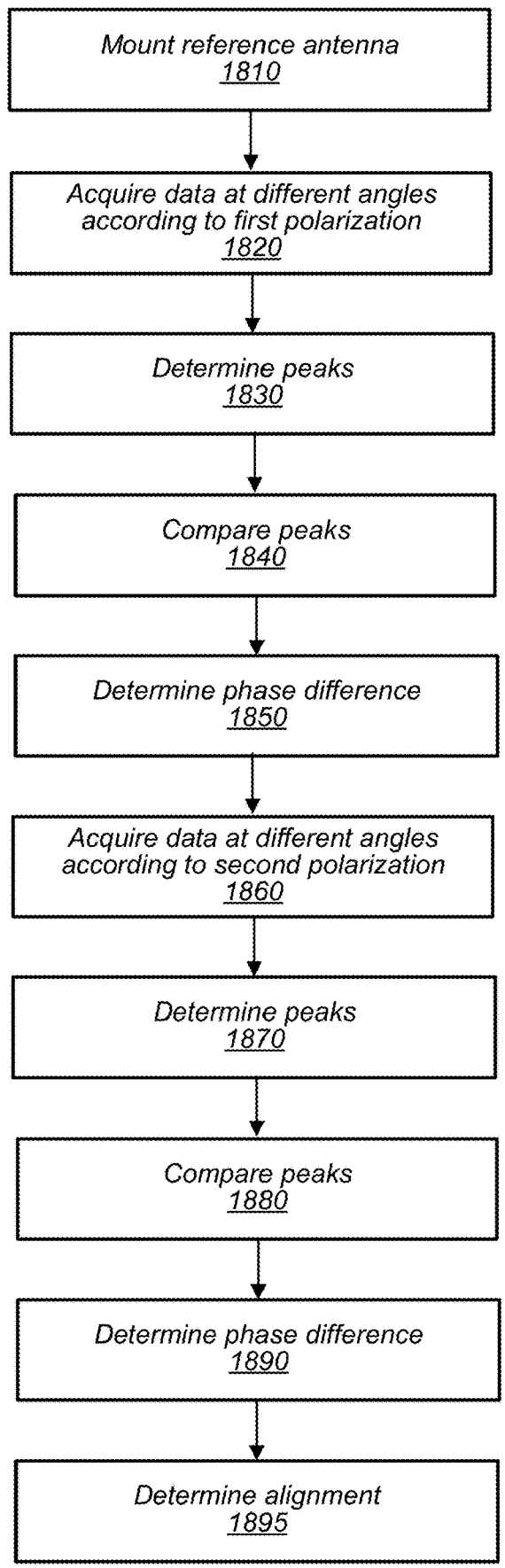

FIG. 18 is a flow chart diagram illustrating a potential test that may improve the speed and cost needed to "validate" the alignment of a CATR system, according to some embodiments. The method of FIG. 18 may be considered an example of the method of FIG. 17. It is noted that the method of FIG. 18 is merely one example of a possible method, and that features of this disclosure may be implemented in any of various methods, as desired. Aspects of the method of FIG. 18 may be implemented by a system including an OTA system, such as illustrated in and described with respect to the Figures, among other systems and devices, as desired. For example, the method of FIG. 18 may be performed by a computer system 82 or a processor in communication with a CATR, e.g., as illustrated in FIG. 16, among various possibilities. For example, a computer or processor may cause the CATR system to perform any or all of the methods automatically, e.g., during an alignment verification routine. In various embodiments, some of the elements of the methods shown may be performed concurrently, in a different order than shown, may be substituted for by other method elements, or may be omitted. Additional method elements may also be performed as desired. As shown, the method may operate as follows.

The reference antenna may be mounted in a CATR (1810), according to some embodiments, e.g., as described above regarding 1710.

The reference antenna may be rotated through various angles (e.g., around a first axis) according to a first polarization while data is gathered (1820), according to some embodiments. For example, the adjustable positioner may rotate the reference antenna through 360 degrees (deg.) of azimuth angle. Measurements may be performed at fixed intervals (e.g., every 2 deg., among various possibilities) for measurements. For example, a feed antenna may transmit a test signal to the reference antenna (e.g., which may be reflected by one or more reflectors of the CATR system). The reference antenna may take measurements of the test signal received for each measurement, e.g., at each interval. For example, the reference antenna may provide the received signal to an SA (and/or VNA) for measurement. The measurements may include phase and/or amplitude, among various possibilities. The measurements may include polarization.

In some embodiments, the first polarization may include test signals (e.g., generated or provided by the SG) transmitted using a particular port of the feed antenna. For example, with the reference antenna mounted in the V polarization, a horizontal (H) port of the feed antenna may be used, e.g., the first polarization may be H polarization.

In some embodiments, the test signals may be transmitted (e.g., based on hardware triggers). For example, the positioner may provide a signal/trigger to indicate that it has reached a position associated with a measurement, e.g., a measurement interval. In response to a trigger, the SG may provide a signal to the test antenna for transmission. Similarly, the trigger may cause the reference antenna to receive and take measurements (e.g., or receive and provide the signal to an SA for measurement) at the position.

In some embodiments, the measurements may be taken by an SA, e.g., connected to the reference antenna. In some embodiments, the measurements may be taken by a VNA.

In some embodiments, the reference antenna may transmit a test signal (e.g., generated or provided by a SG) and the feed/test antenna may receive the test signal (e.g., and provide the received signal to an SA for measurement). Thus, measurements may be taken of signals transmitted by the reference antenna at each measurement interval in addition to or instead of signals received by the reference antenna.

In some embodiments, the rotation may not be stopped at the intervals, e.g., to allow time for measurements. In other embodiments, the rotation may not be stopped, e.g., the measurements may be taken while the reference antenna is rotating.

In some embodiments, the intervals may be variable (e.g., more closely spaced in some regions and more widely spaced in other regions).

The data on phase and amplitude (and/or other measurements) may be recorded. The data may be stored with the angle associated with each measurement.

The amplitude peaks of the measurements of the test signals may be determined (1830), according to some embodiments. For example, the data on amplitude of the received test signals may be analyzed. For example, if the feed antenna and reflector(s) are well aligned (e.g., and produce a good planar wave) the amplitude profile may be expected to have two peaks. The peaks may be located at or near azimuth angles of 90 deg and 270 deg. Such peaks may represent the co-polarization locations of port H. However, if the feed antenna and reflector(s) are not well aligned, the amplitude data may exhibit peaks in different or additional locations, or may not exhibit peaks at or near the expected locations.

In some embodiments, to find the actual peak amplitude location(s) (e.g., angle(s)), first an overall peak (e.g., maximum) and an overall minimum may be determined. In other words, the angular position associated with the maximum amplitude measurement (e.g., within the full rotation around the first axis, e.g., 0 deg. to 360 degrees azimuth angle) may be found. In some embodiments, a threshold value may be calculated based on a comparison of the minimum and maximum values.

Second, a maximum value within a range near one of the expected peaks may be determined, according to some embodiments. For example, a maximum value within a specified angle (e.g., 50 deg.) of an expected peak may be found. For example, using the angle of 50 deg., the range may be 40 to 140 deg. The maximum amplitude and the corresponding angle may be determined within the range, e.g., for the actual peak within the range.

Third, the amplitude data within the specified angle of the actual peak may be extracted (e.g., plus/minus the specified angle from the angle of the actual peak). The extracted data may be used to generate a new amplitude curve.

Fourth, the new curve may be smoothed using a filter, e.g., Savitzky-Golay, average filter, among various possibilities. For example, the number of side points may be set to 6 and the polynomial order may be set to 3.

Fifth, the peak location within the smoothed curve may be determined. A threshold may be used. For example, values below the threshold may be ignored or discarded from the analysis. The (e.g., smoothed) amplitude at the peak location may be the peak amplitude. The peak amplitude may be greater than the threshold.

The second through fifth steps may be repeated for the second expected peak. For example, if the first expected peak is near 90 deg., the second expected peak may be near 270 deg. Thus, the range in the second step may be 220 to 320 deg., in this example.

Thus, two peaks may be determined, e.g., based on the smoothed curves.

The amplitudes of the two peaks may be compared (1840), according to some embodiments. For example, a difference between the amplitudes of the two peaks may be calculated, and the difference may be compared to a threshold. For example, the threshold may be 1 dB, among various possibilities. If the difference between the amplitudes of two peaks is greater than or equal to the threshold, it may be determined that the CATR system is not well aligned. If the difference between the amplitudes is less than the threshold, the method may continue.

A phase difference between two points (e.g., of the unsmoothed phase data) may be determined (1850), according to some embodiments. For example, the two points (e.g., two angles) may be 0 deg. and 360 deg. azimuth angle, among various possibilities. The phase difference between the two points may be compared to a threshold, e.g., 5 deg. If the phase difference is greater than or equal to the threshold, it may be determined that the CATR system is not well aligned. If the difference between the phases is less than the threshold, the method may continue.

In some embodiments, the threshold may depend on the two points (e.g., if angles different than 0 deg. and 360 deg. are used, a different threshold may be used).

The reference antenna may be rotated through various angles (e.g., around the first axis) according to a second polarization while further data is gathered (1850), according to some embodiments. The process of rotating the antenna and gathering data may be similar to the description of 1820 above, however a different polarization may be used. For example, if the first polarization uses the H port of the feed antenna, the second polarization may use the V port of the feed antenna. Thus, the test signals transmitted according to the second polarization may be polarized 90 deg. differently relative to the test signals transmitted according to the first polarization. In the case of the second polarization, the rotation may be viewed as rotating from −90 deg. to 270 deg., and the expected peaks may be at azimuth angled 0 deg. and 180 deg., according to some embodiments.

The amplitude peaks according to the second polarization may be determined (1870), according to some embodiments. The peaks may be determined in a similar manner to the first polarization, e.g., as described above with respect to 1830. For the second polarization, the search ranges may be adjusted to correspond to the expected peak locations. For example, the ranges may be −50 deg. to 50 deg and 130 deg. to 230 deg., respectively.

The amplitude peaks according to the second polarization may be compared (1880), according to some embodiments. The peaks may be compared in a similar manner to the first polarization, e.g., as described above with respect to 1840.

A phase difference between two points (e.g., of the unsmoothed phase data according to the second polarization) may be determined (1890), according to some embodiments. The phase difference may be determined and compared to a threshold in a similar manner to the first polarization, e.g., as described above with respect to 1850.

The system may determine whether the CATR is well aligned (1895), according to some embodiments.

In some embodiments, if at any point in the method, a determination is made that the CATR system is not well aligned, the method may be stopped. The system may attempt to improve the alignment (e.g., considering the data recorded and/or the step during which the determination that the system is not well aligned was reached). The method may be restarted (e.g., from 1810 or 1820, among various possibilities) after the attempt to improve alignment is complete.

In some embodiments, if no determination is made that the CATR system is not well aligned (e.g., at or prior to 1895), it may be determined that the CATR system is sufficiently well aligned. Thus, the CATR system may be further tested and/or may be used to test one or more DUTs.

It will be appreciated that the method of FIG. 18 is primarily described with respect to the first polarization (e.g., 1820-1850) being used first and the second polarization (e.g., 1860-1890) being used second. However, this is only an example and other timing arrangements may be used as desired. For example, the two polarizations may be used in an overlapping, simultaneous, or alternating manner. For example, at each rotational position of the reference antenna, a first test signal may be transmitted according to the first polarization and a second test signal may be transmitted according to the second polarization. Thus, phase and amplitude data for both polarizations may be recorded during a single 360 deg. rotation of the reference antenna, e.g., 1820 and 1860 may be combined. Further, the determination of peaks (1830, 1870), comparison of peaks (1840, 1880), and determination of phase differences (1850, 1890) may all be performed (e.g., simultaneously or in any order desired) after the data is recorded.

In some embodiments, the various thresholds used for the second polarization may be the same as the corresponding thresholds used for the first polarization. In some embodiments, some or all of the thresholds may be different in the second polarization relative to the first polarization. For example, different thresholds may be used in a case when the second polarization is sweep in a different motion pattern. In some embodiments, the thresholds may depend on the pattern of motion (e.g., positions/orientations) used in a sweep with the polarization. The pattern of motion for the different polarizations may be the same or the pattern of motion may be different for the different polarizations.

Figure 19:
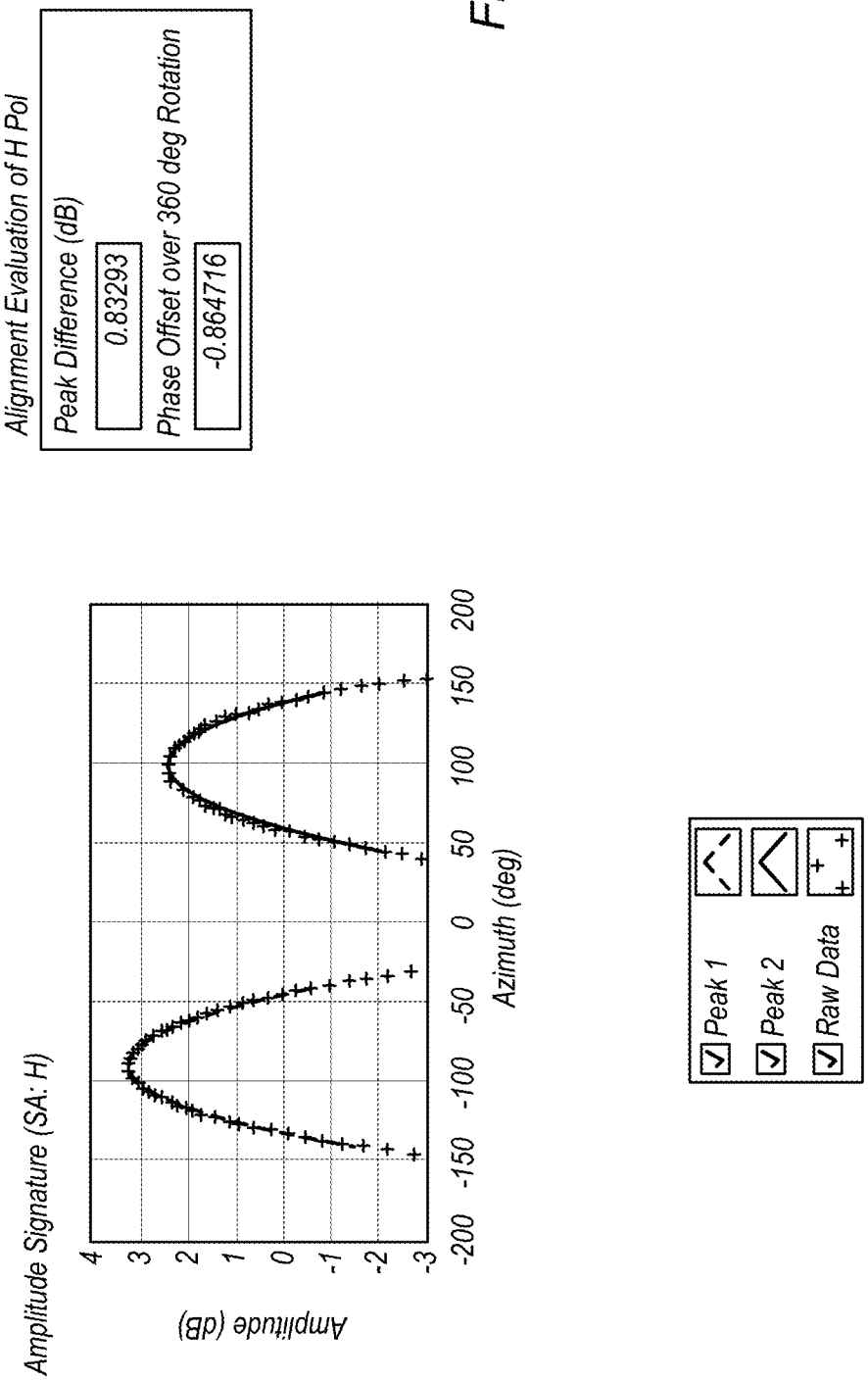
FIGS. 19 and 20 illustrate aspects of measurements useful for verifying alignment of a CATR, according to some embodiments.
Figure 20:
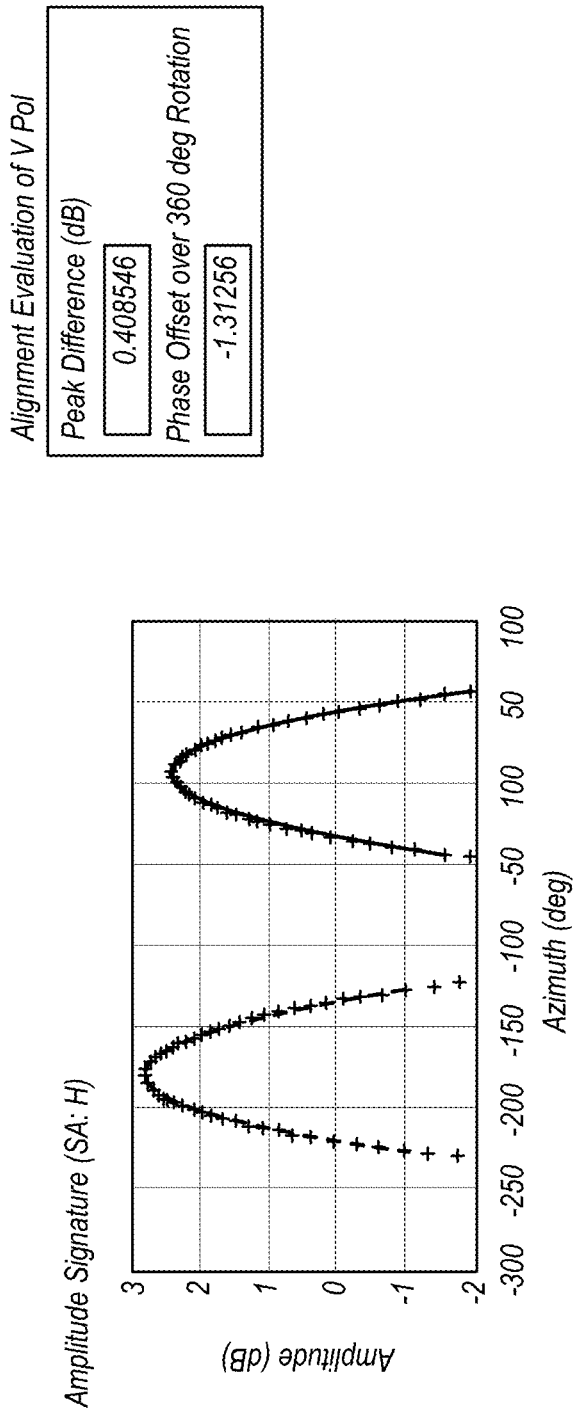
Figure 20:
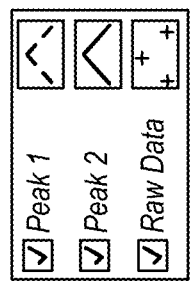

FIGS. 19 and 20 illustrate exemplary measurement results, according to some embodiments. For example, FIG. 19 may represent results of amplitude measurements according to a first polarization and FIG. 20 may represent amplitude measurements according to a second polarization. Each graph may illustrate the raw data (e.g., amplitude by azimuth angle) and smoothed curves for each of two peaks, e.g., as described with respect to 1720, 1730, 1760, and 1770. Further, the difference in amplitudes of the peaks for each polarization is shown, e.g., as described with respect to 1740 and 1780. Further, the phase offset at different angles (e.g., using the example of 360 deg. rotation) is shown for each polarization, e.g., as described with respect to 1750 and 1790. It will be appreciated that FIGS. 19 and 20 are examples. Different values may be determined in actual testing. Further, different display techniques may be used and/or the measurement data may not be displayed at all, according to some embodiments.

An example of the method of FIG. 17 is described below.

For testing a fixture like a CATR, an antenna may be mounted to measure a signal. Since most CATR chambers may have a dual axis positioner, the elevation may be turned to −90 deg and then a test may be started where phase and amplitude data is gathered while azimuth turns 360 deg. The reference antenna may be mounted as V polarization.

The system may acquire the phase and amplitude data every 2 degrees in azimuth angle through feed antenna port H. If the feed antenna and reflector are well aligned and produce a good planar wave, the amplitude profile may have two peaks at azimuth=90 deg and 270 deg, representing the co-polarization locations of port H.

The system may find peak locations. To find the actual peak location and amplitude around azimuth=90 deg, the following five steps may be used.
1. Find the maximum and minimum values of the amplitude profile from 0 deg to 360 deg. Calculate the threshold T=minimum+(maximum−minimum)*25%.
2. Search the maximum value within the range from 40 deg to 140 deg. Suppose the maximum amplitude is A1 and the corresponding azimuth angle is Az1.
3. Extract the amplitude data from (Az1−50) deg to (Az1+50) deg to form a new amplitude curve.
4. Smooth the curve using Savitzky-Golay filter. The number of side points is set to 6. The polynomial order is set to 3.
5. Search the peak location in the smoothed curve with T as the threshold. The amplitude at peak location is the peak amplitude.

To find the actual peak location and amplitude around azimuth=270 deg, the search range may be 220 deg to 320 deg steps 2 to 5 may be repeated to find the peak amplitude.

The system may compare the peak differences. If the feed antenna and reflector are well aligned, the difference between the peak amplitudes found in step 4 and step 5 may be less than 1 dB.

The system may check the phase difference between azimuth=0 deg and azimuth=360 deg. If the feed antenna and reflector are well aligned, the phase difference may be less than 5 deg.

The system may acquire the phase and amplitude data every 2 degrees though feed antenna port V while the fixture rotates from −90 deg to 270 deg. Similarly, the amplitude profile may have two peaks at azimuth=0 deg and 180 deg, representing the co-polarization of port V.

The system may find peak locations. To find the actual peak location and amplitude around azimuth=0 deg and 180 deg, the search ranges may be from −50 deg to 50 deg, and from 130 deg to 230 deg, respectively.

The system may compare the peak differences. If the feed antenna and reflector are well aligned, the difference between the peak amplitudes found in step 4 and step 5 may be less than 1 dB.

The system may check the phase difference between azimuth=−90 deg and azimuth=270 deg. If the CATR is well aligned, the difference may be less than 5 deg.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for verifying alignment of a compact antenna test range (CATR), the method comprising:
at the CATR:
rotating, by a positioner of the CATR, a reference antenna through a plurality of angles;
transmitting, by a test antenna of the CATR, a plurality of test signals;
receiving, by the reference antenna, the plurality of test signals at the plurality of angles;
determining phase and amplitude of the test signals as received by the reference antenna; and
determining, based on the phase and amplitude of the test signals as received by the reference antenna, whether the alignment of the CATR is verified.

2. The method of claim 1, wherein the plurality of test signals comprises a first plurality of test signals according to a first polarization and a second plurality of test signals according to a second polarization.

3. The method of claim 1, wherein said determining whether the alignment of the CATR is verified comprises determining a first amplitude peak of the test signals as received by the reference antenna and a second amplitude peak of the test signals as received by the reference antenna.

4. The method of claim 3, wherein said determining whether the alignment of the CATR is verified further comprises:
determining a difference between the first amplitude peak and the second amplitude peak; and
comparing the difference to a threshold.

5. The method of claim 4, wherein the alignment of the CATR is not verified in response to the difference exceeding the threshold.

6. The method of claim 5, the method further comprising adjusting a tilt and/or position of a reflector in response to the difference exceeding the threshold.

7. The method of claim 4, wherein the alignment of the CATR is verified in response to the difference being less than the threshold.

8. A compact antenna test range (CATR), comprising:
a test antenna;
a reflector;
a positioner;
a reference antenna mounted to the positioner; and
a processor configured to cause the CATR to:
rotate the test antenna through a plurality of orientations using the positioner;
transmit a plurality of test signals from the test antenna to the reference antenna via the reflector while the reference antenna is in the plurality of orientations;
determine phase or amplitude information of the plurality of test signals as received by the reference antenna; and
determine that the reflector is not in alignment based on the phase or amplitude information.

9. The CATR of claim 8, wherein the determination that the reflector is not in alignment is based on a comparison of phase information associated with two orientations of the plurality of orientations.

10. The CATR of claim 9, wherein a first orientation of the two orientations is 360 degrees different than a second orientation of the two orientations.

11. The CATR of claim 9, wherein the determination that the reflector is not in alignment is based on a determination that a difference between respective phases of measurements associated with the two orientations exceeds a threshold.

12. The CATR of claim 11, wherein the processor is further configured to cause the reflector to change tilt and/or position in response to the determination.

13. The CATR of claim 8, wherein the reference antenna is operably connected to a signal analyzer, wherein the determination of the phase and/or amplitude information is performed by the signal analyzer.

14. The CATR of claim 8, wherein the plurality of test signals are provided by a signal generator.

15. An apparatus, comprising:
a processor configured to:
receive a plurality of measurements from a signal analyzer associated with a compact antenna test range (CATR), wherein the plurality of measurements include:
a plurality of phase measurements associated with a plurality of azimuthal angles; and
a plurality of amplitude measurements associated with the plurality of azimuthal angles; and
determine, based on the plurality of phase measurements and the plurality of amplitude measurements whether the CATR is aligned within a tolerance.

16. The apparatus of claim 15, wherein the measurements use a signal analyzer and do not use a vector network analyzer (VNA).

17. The apparatus of claim 15, wherein the measurements are performed with a reference antenna at a single location in the CATR.

18. The apparatus of claim 15, wherein the plurality of azimuthal angles are at fixed intervals.

19. The apparatus of claim 15, wherein to determine whether the CATR is aligned within the tolerance, the processor is further configured to:
identify a first peak within a range of a first expected azimuthal angle; and
identify a second peak within the range of a second expected azimuthal angle.

20. The apparatus of claim 19, wherein the first peak and the second peak are identified based on smoothed amplitude data.

* * * * *